Jan. 17, 1956 I. GHERTMAN ET AL 2,731,199

COMPUTING MECHANISMS FOR CHECKING COMPUTATIONS

Filed Sept. 11, 1952 10 Sheets-Sheet 1

INVENTORS
IOINO GHERTMAN
EDMOND FEBVRE
BY J. W. Lomnitzer
ATTORNEY

COMPUTING MECHANISMS FOR CHECKING COMPUTATIONS

Filed Sept. 11, 1952 10 Sheets-Sheet 2

INVENTORS
IOINO GHERTMAN
EDMOND FEBVRE
BY J. W. Lowuitzer
ATTORNEY

COMPUTING MECHANISMS FOR CHECKING COMPUTATIONS

Filed Sept. 11, 1952

10 Sheets-Sheet 3

INVENTORS
IOINO GHERTMAN
EDMOND FEBVRE
BY J. W. Lonnitzer
ATTORNEY

INVENTORS
IOINO GHERTMAN
EDMOND FEBVRE
BY J. W. Lowenitzer
ATTORNEY

INVENTORS
IOINO GHERTMAN
EDMOND FEBVRE
BY J. W. Lomuitzer
ATTORNEY

Jan. 17, 1956 I. GHERTMAN ET AL 2,731,199

COMPUTING MECHANISMS FOR CHECKING COMPUTATIONS

Filed Sept. 11, 1952 10 Sheets-Sheet 6

INVENTORS
IOINO GHERTMAN
EDMOND FEBVRE
BY J. W. Lonnitzer
ATTORNEY

COMPUTING MECHANISMS FOR CHECKING COMPUTATIONS

Filed Sept. 11, 1952 10 Sheets-Sheet 7

INVENTORS
IOINO GHERTMAN
EDMOND FEBVRE
BY F. W. Lomnitzer
ATTORNEY

INVENTORS
IOINO GHERTMAN
EDMOND FEBVRE
BY
J. W. Lowenitzer
ATTORNEY

Jan. 17, 1956 I. GHERTMAN ET AL 2,731,199

COMPUTING MECHANISMS FOR CHECKING COMPUTATIONS

Filed Sept. 11, 1952 10 Sheets-Sheet 9

INVENTORS
IOINO GHERTMAN
EDMOND FEBVRE
BY F. W. Lowenitzer
ATTORNEY

COMPUTING MECHANISMS FOR CHECKING COMPUTATIONS

Filed Sept. 11, 1952 10 Sheets-Sheet 10

INVENTORS
IOINO GHERTMAN
EDMOND FEBVRE

BY J. W. Lowenitzer
ATTORNEY

United States Patent Office 2,731,199
Patented Jan. 17, 1956

2,731,199

COMPUTING MECHANISMS FOR CHECKING COMPUTATIONS

Ioino Ghertman and Edmond Febvre, St. Mande, France, assignors to International Business Machines Corporation, New York, N. Y., a corporation of New York Application September 11, 1952, Serial No. 309,111
Claims priority, application France October 6, 1951
11 Claims. (Cl. 235—61.7)

The present invention relates to devices for effecting a computation under control of digits of a single number according to an arbitrary mathematical law to obtain a result which represents a checking symbol, and preferably utilizing comparing devices to determine whether said result agrees with a precomputed checking symbol already indicated on a record and related to said number.

Due to the lack of infallibility of operators in punching correct holes on records representing numbers taken from a source data or operating keys of an adding mechanism, it is a well known practice to assign to each number a precomputed symbol. This symbol has been a digit computed according to an arbitrary computation, with the digits of the number in question involved in the computation. To this end it has been the object of other inventions to compute and assign a checking digit symbol which depends upon all the digits of a number and their denominational order.

The main object of the present invention is to provide means for computing under control of said number two coded components identifying a symbol or a letter, although the invention comprises computing means to compute either of said components, since each is of utility. Thus, the computing means, derives not only a single result, but two results, such as a zone representation and a digit representation. In the well known statistical code, as shown in Fig. 5, both a zone hole 0, X, R, and a digit hole 1–9 represent a letter, A, B, C, to Z. Thus, there may be a greater number of checking symbols than acquired heretofore by previously designed symbol computing devices.

A still further object of the invention is to provide means to compare the zone and digit components with the zone and digit holes on a card carrying the number to verify the checking symbol represented by such holes.

A still further object of the invention is to indicate or designate whether a disagreement is obtained by the comparing means. Preferably, this is carried out by controlling the primary feeding mechanism of the collator in such manner than an erroneous number card will be disposed in another, or reject pocket. In this manner erroneous cards are selectively sorted out, and one pocket receives only number cards having correct checking symbols.

A still further object is to provide means whereby the comparing means causes the initiation of the secondary card feeding means to cause the feeding of a blank card in the hopper in which correct symbol cards are sorted as a substitute for the erroneous symbol card.

Other objects of the invention will be pointed out in the following description and claims and illustrated in the accompanying drawings, which disclose, by way of example the principle of the invention and the best mode, which has been contemplated, of applying that principle.

In said drawings:

Fig. 1 is a longitudinal sectional view of a type of record controlled machine known as a "collator" in which the present improvements are preferably incorporated;

Figs. 2*a*, *b*, *c*, *d*, *e*, *f*, *g*, and *h* when assembled, in the named order, constitute a wiring diagram;

Figure 1:
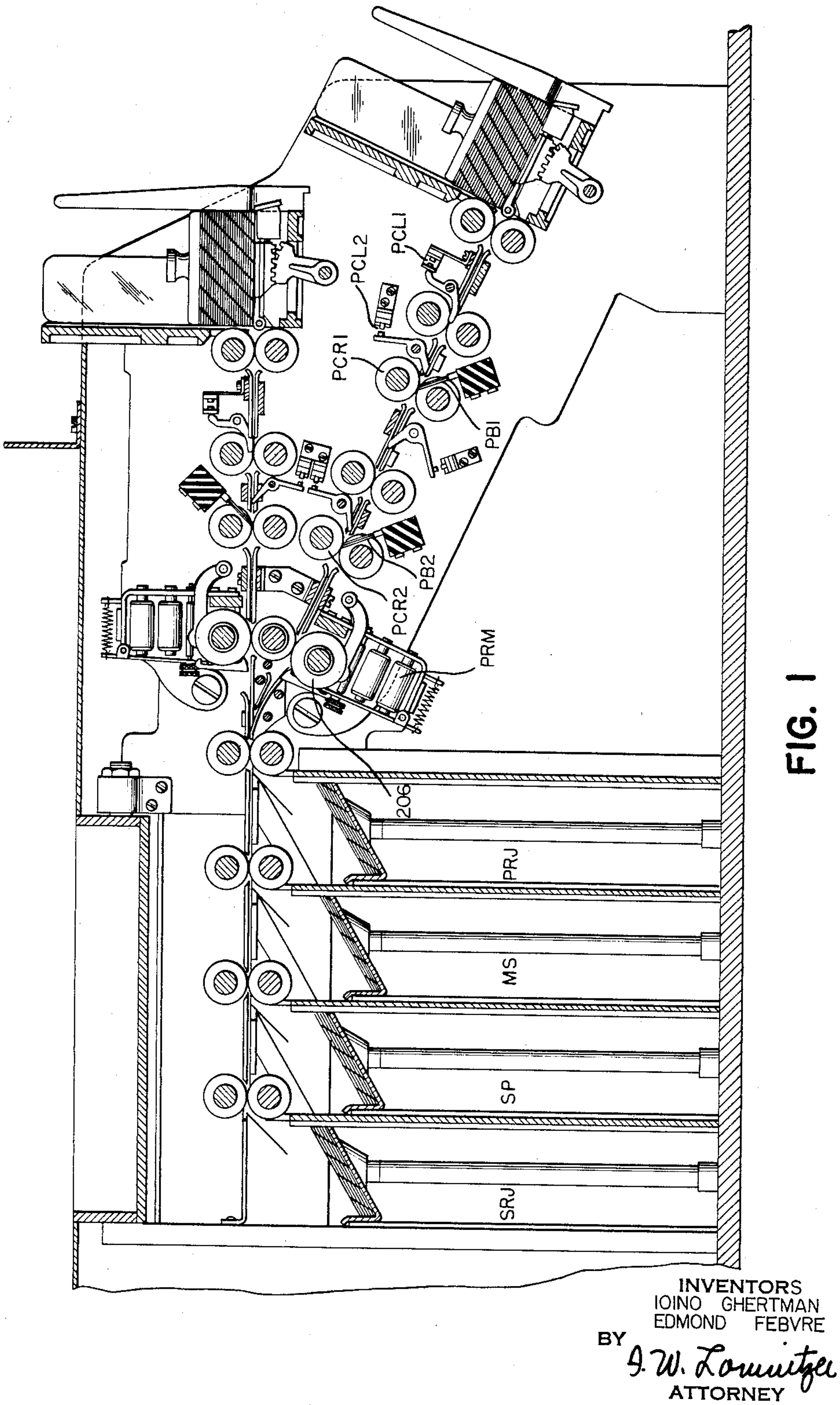

The present invention may be incorporated in various forms of machines and its embodiment in the form of record controlled machine known as a "collator" is preferable in order to utilize its two reading stations for entry and symbol comparison purposes, and its selective sorting and card feeding mechanisms to sort out erroneous symbol records from correct symbol records and to replace erroneous symbol records by blank records. Preferably, the present invention is embodied in that type of collator machine shown in the French Patent No. 833,975, filed December 21, 1937, and the corresponding U. S. patent to R. E. Page, No. 2,359,670, issued October 3, 1944. The general form of machine is shown in Fig. 1 and comprises two card feed sections known in the art as "primary," which is the lower section, and "secondary" which is the upper section. The primary cards are stacked in the lower hopper and the secondary cards in the upper hopper. Cards are fed from each of these hoppers to be analyzed and in accordance with the analyzation and comparison, cards are sorted, rejected, or merged in card pockets PRJ, MS, SP, SRJ in a well known manner.

The starting circuits for initiating and continuing successive cycles of operation of the machine are not shown or described herein since they are fully shown and described in the aforementioned patent to Page No. 2,359,670. Recourse may be had to this patent of a full understanding of this operation of the machine and also the feeding mechanism whereby cards placed in the primary hopper are fed one by one therefrom as the successive cycles of operations of the machine ensue, in order that their designated values may be sensed in the primary card feed section of the machine and control the symbol determining and computing mechanism constituting the present invention. In order that the electrical circuits of the machine may be understood it is to be understood that the machine has a series of cam operated contacts which close and open in accordance with the timing diagram shown in Fig. 3. Only the timing of the contacts of the circuits of the present invention is shown in Fig. 3, it being assumed that the machine has other electrical contacts disclosed in the aforesaid Page Patent No. 2,359,670.

Figure 2A:
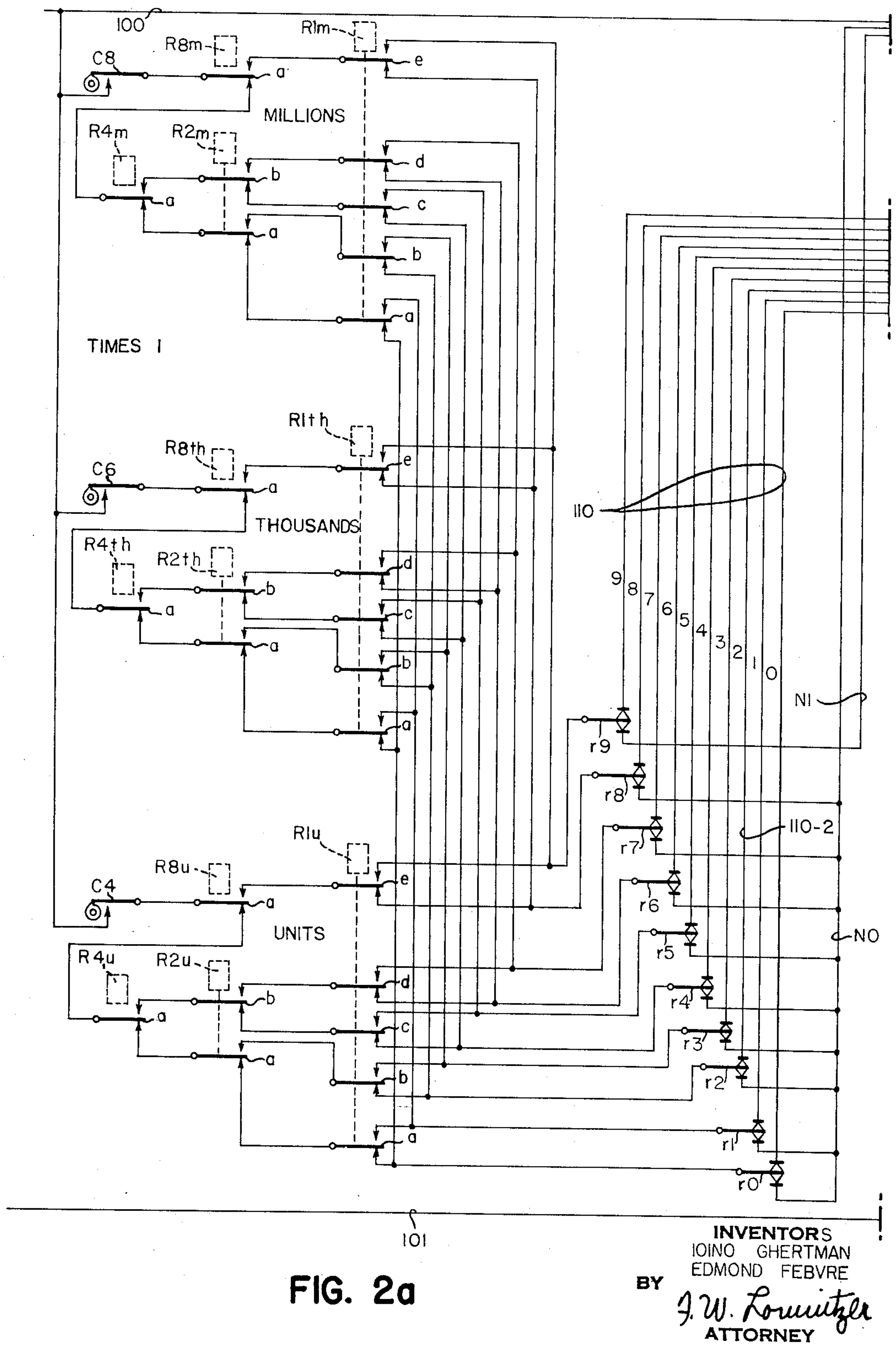
Figure 2B:
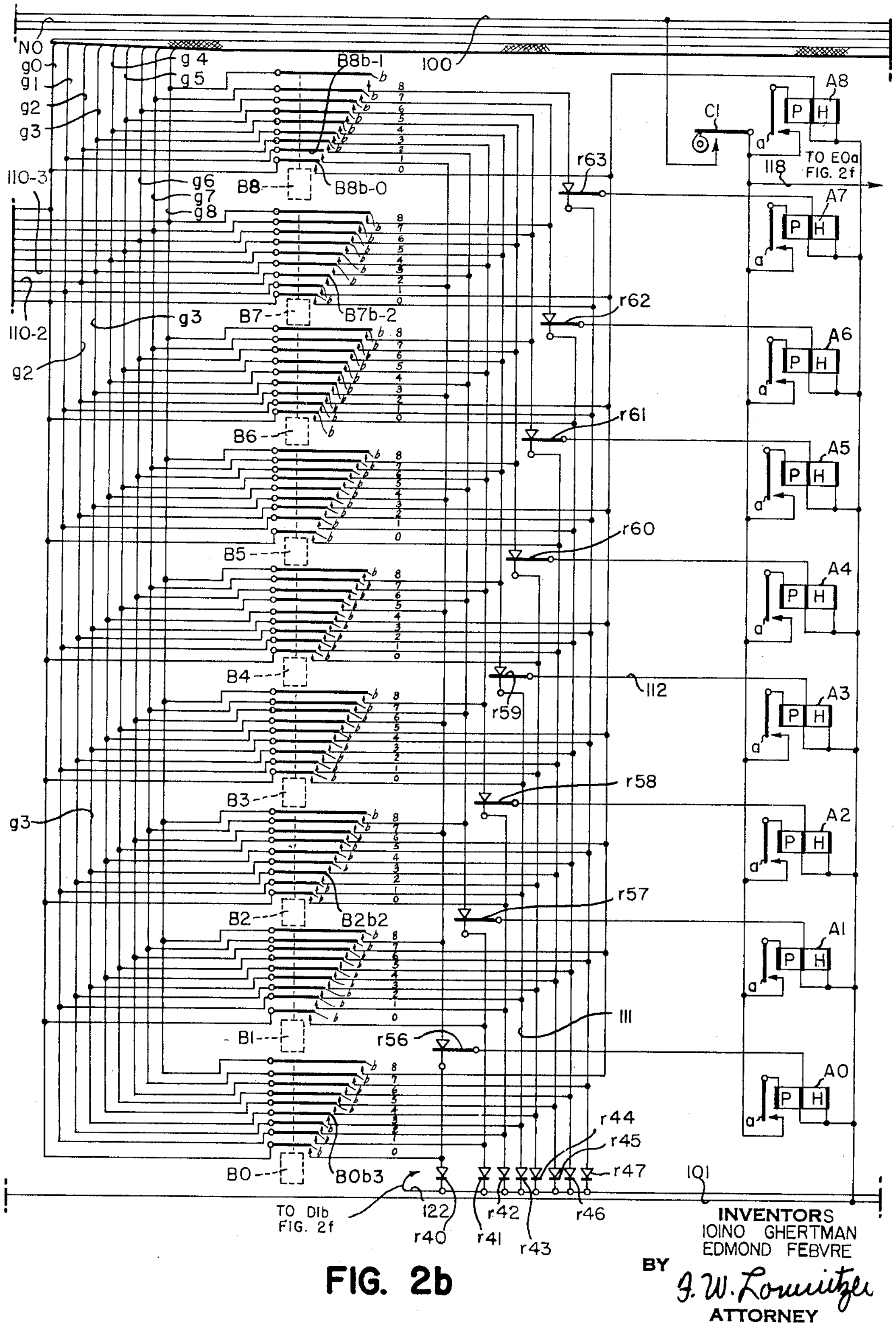
Figure 2C:
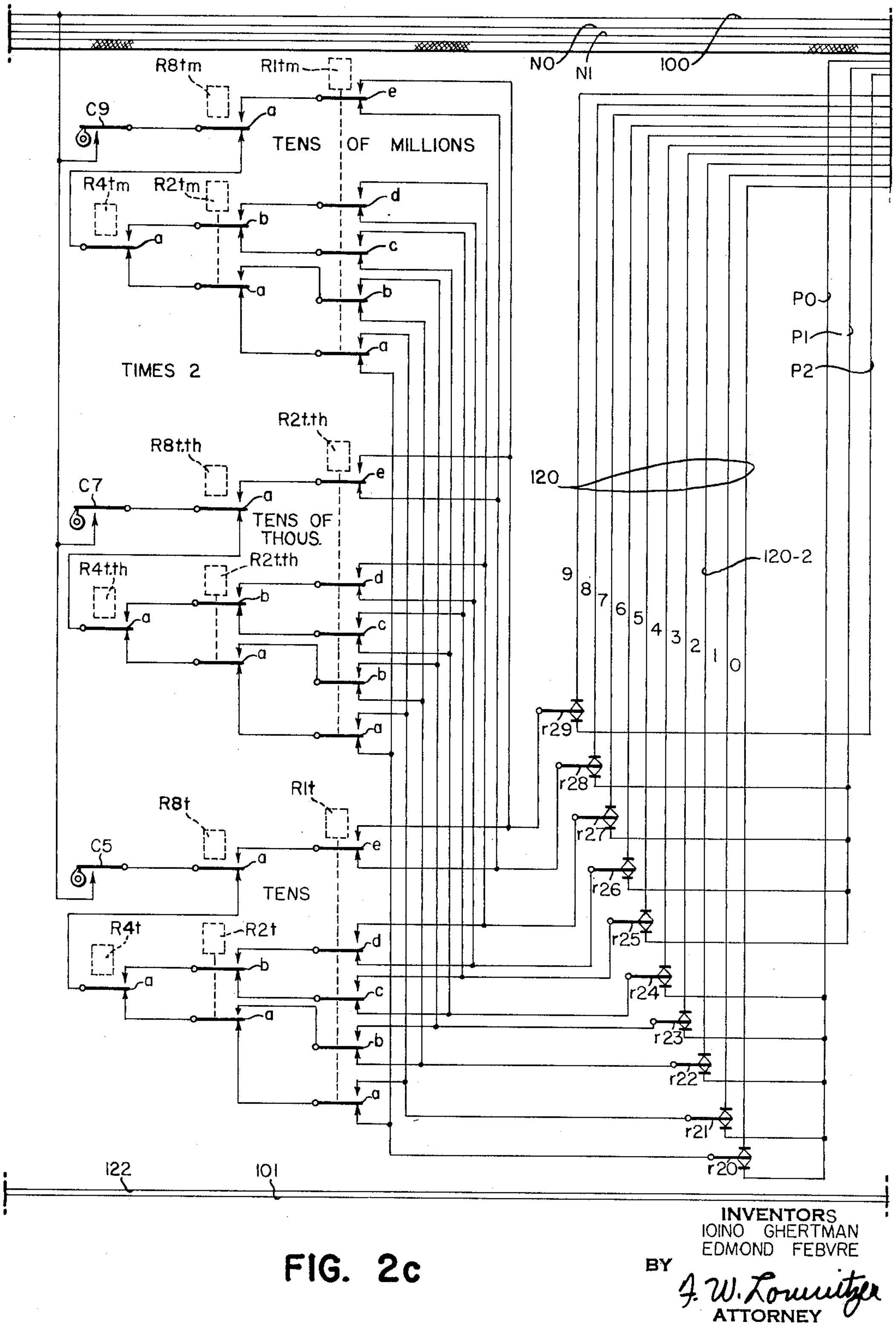
Figure 2D:
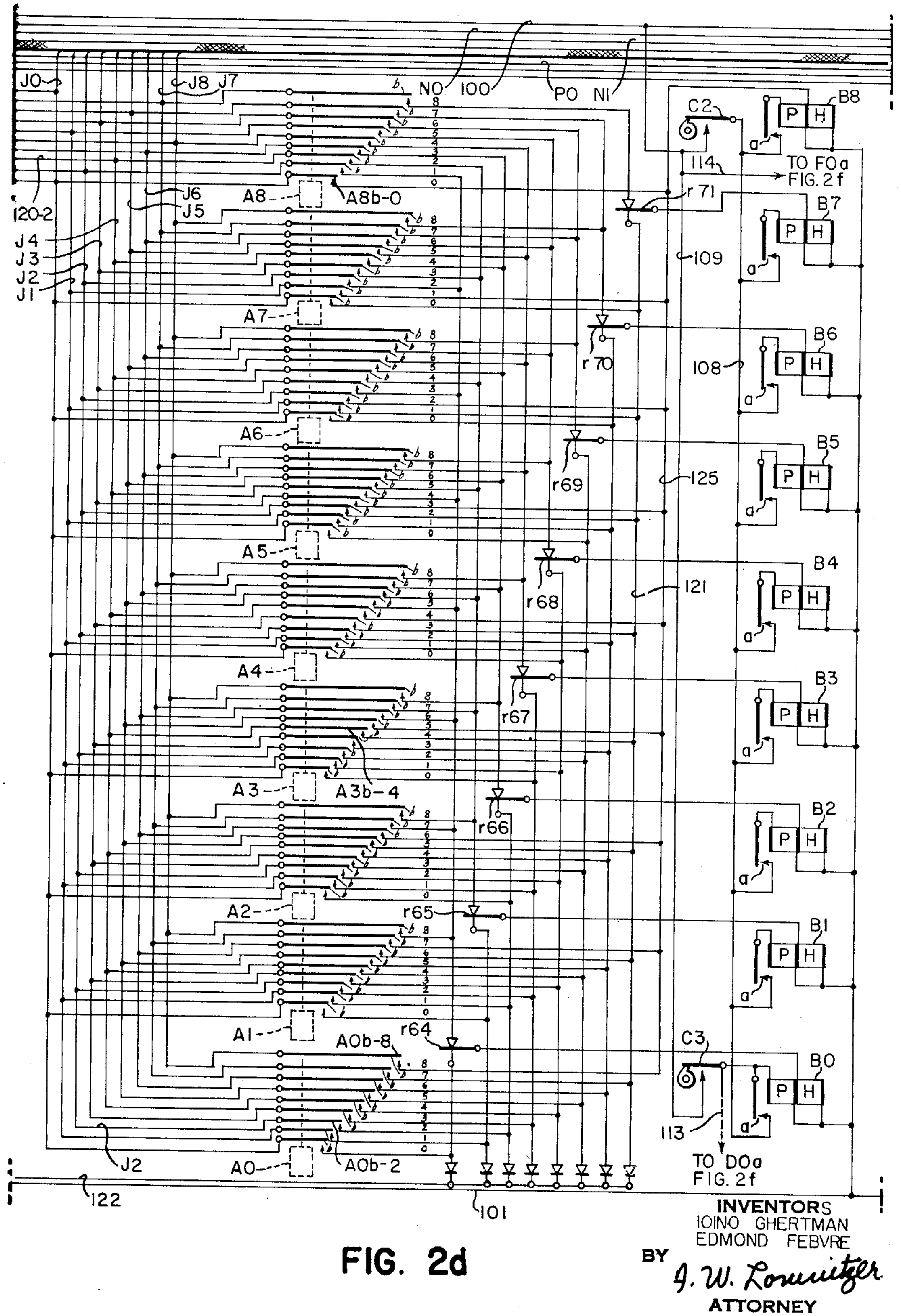
Figure 2E:
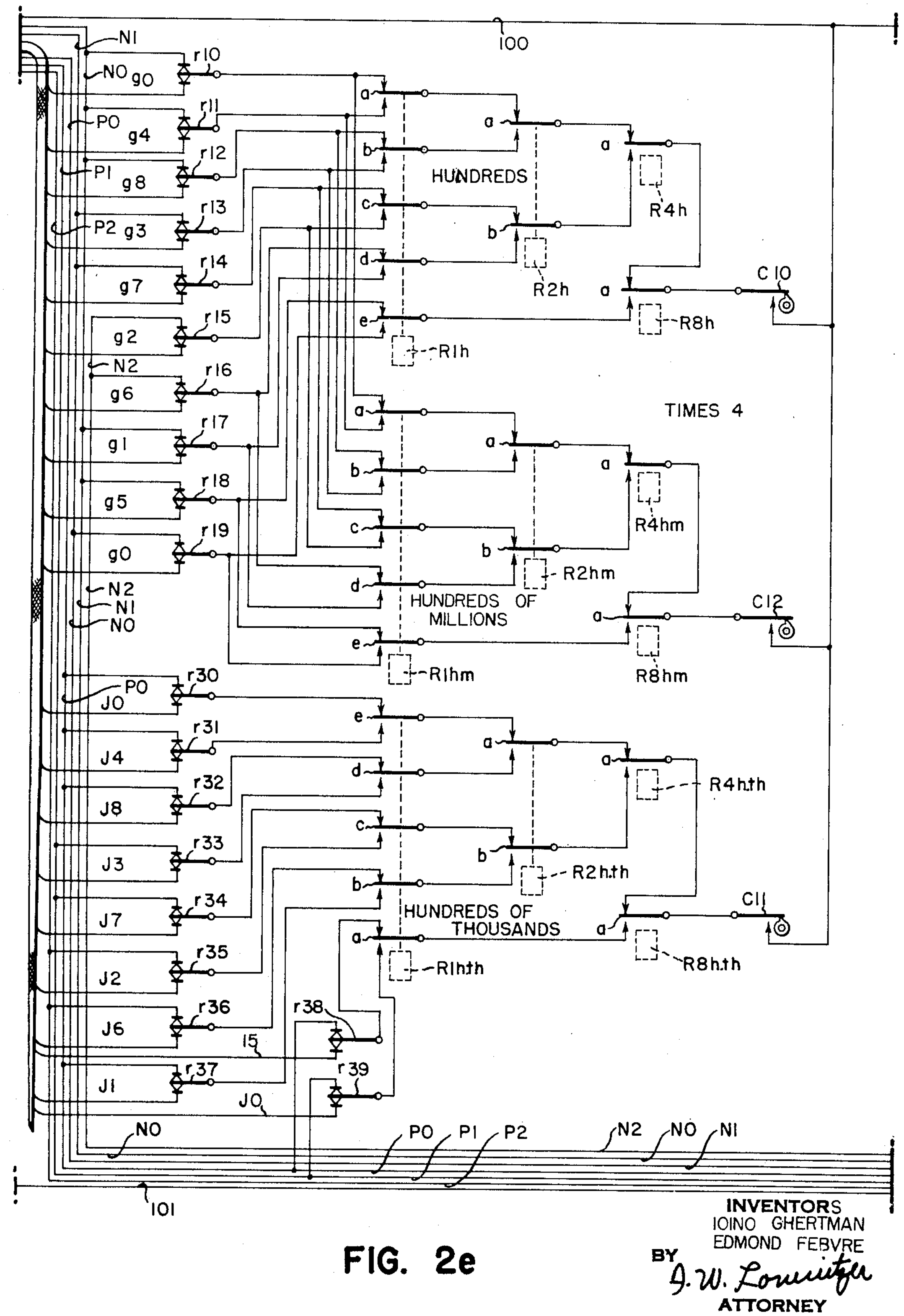
Figure 2F:
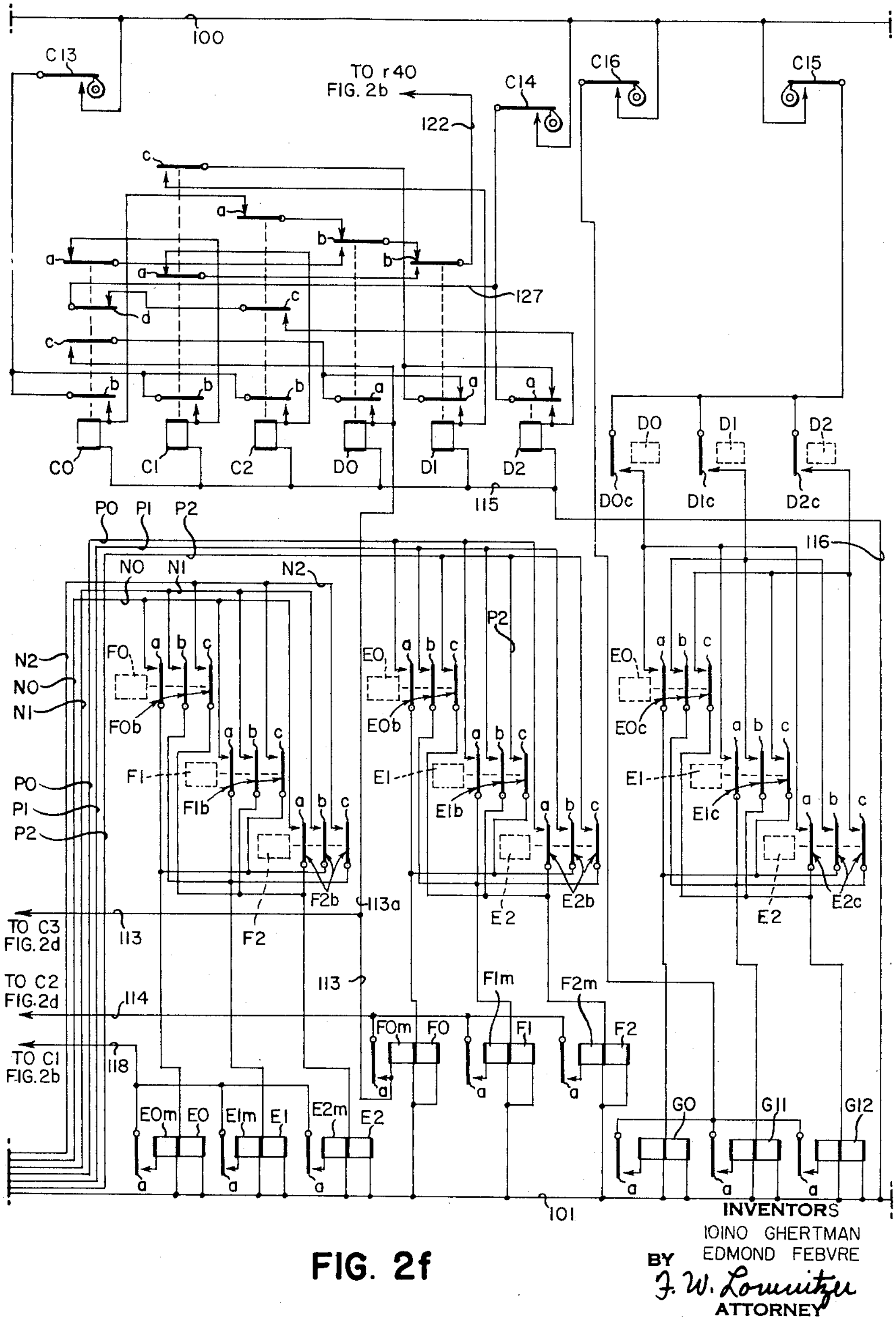
Figure 2G:
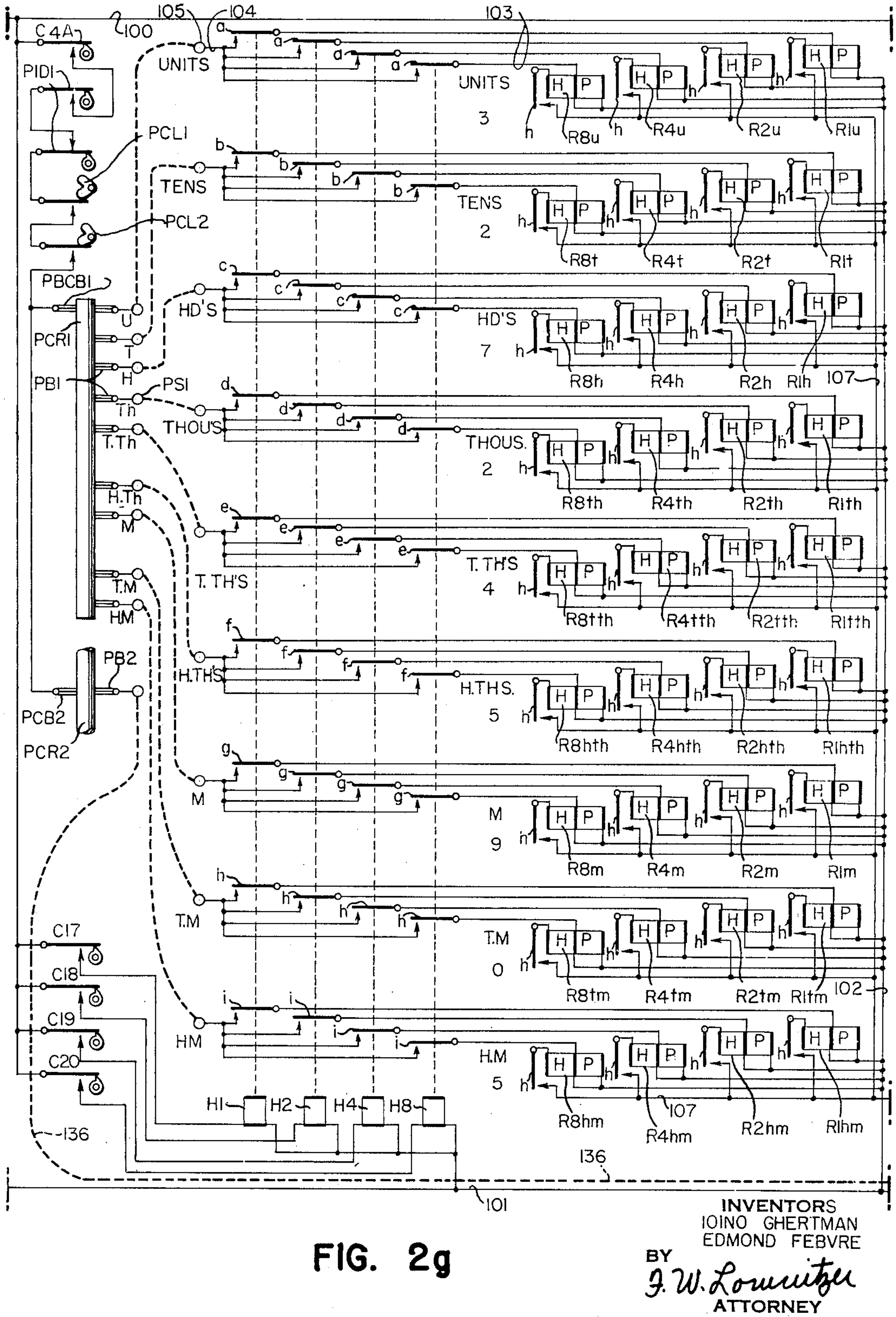
Figures 3, 4:
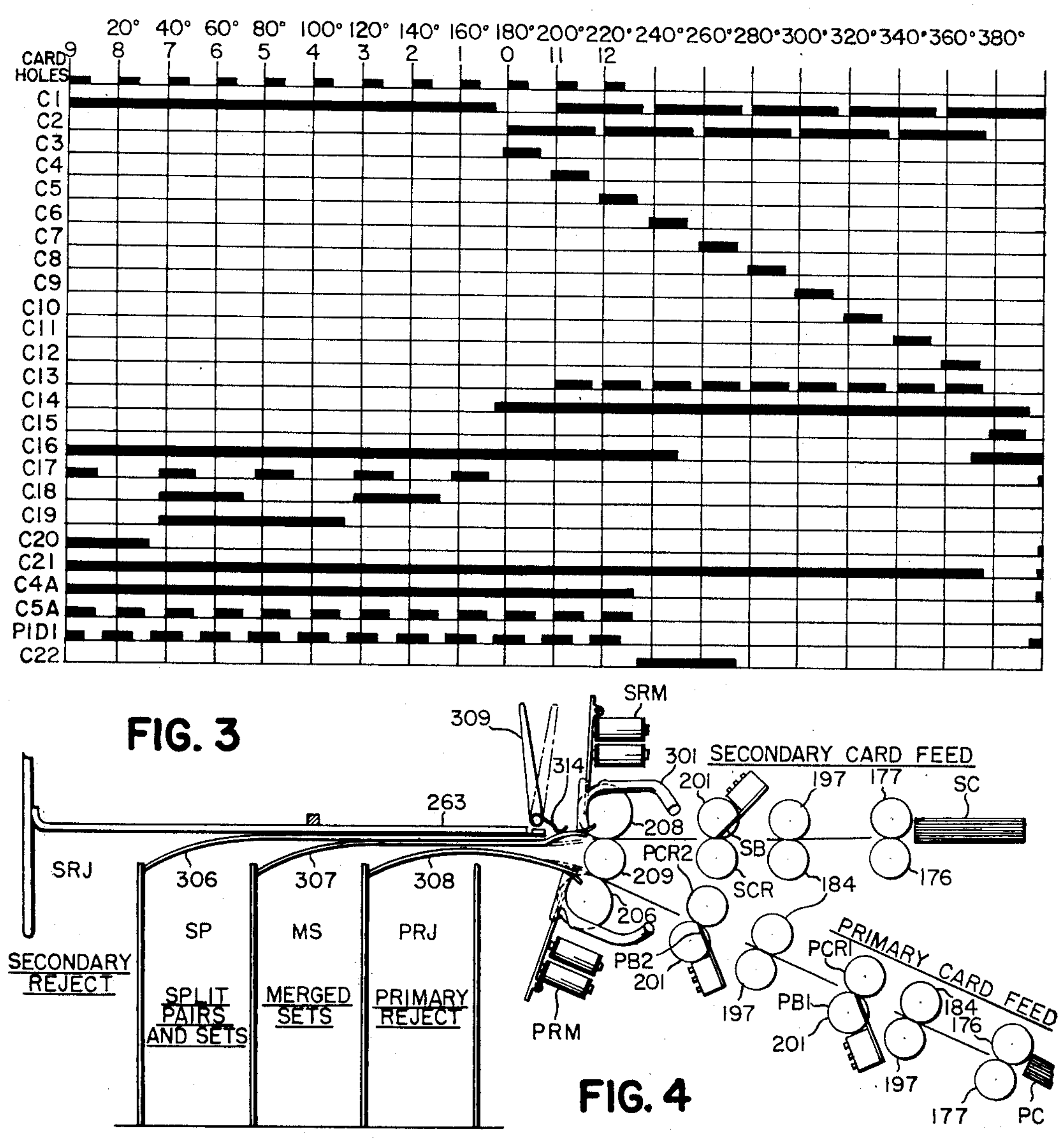
Fig. 3 is a timing diagram of the cam operated and other electrical contacts.
Fig. 4 is a diagrammatic view showing the manner of feeding and sorting records in the collator.

In initiating the operation of the machine, three cycles ensue before the first card fed out of the primary hopper passes by the first set of analyzing brushes PB1 (Figs. 2*g* and 3). Assuming that this first card is punched with a representative number it is fed past said analyzing brushes PB1 and during this third cycle the representative number is analyzed and stored up in storage relays by a circuit described as follows: From the line side 100 through cam contacts C4A (Fig. 2*g*) which are closed during the time that the punched holes are analyzed, thence through P1D1 circuit breaker contacts which transmit impulses synchronously with the times that the punched holes 9–1, 0, 11 and 12 are sensed in this order, thence through card lever contacts PCL1 and PCL2 which are now closed in the manner fully described in the aforementioned Patent No. 2,359,670, thence to a contact roller brush PBCB1, contact roller PCR1, brushes PB1 to plug sockets PS1. Only the brushes PB1 for sensing nine columns of numerical data are shown and such plug sockets are designated units, tens, hundreds, thousands, up to and including hundreds of millions order, it being assumed that the number whose checking symbol is to be computed may consist of nine denominational orders. Of course, this is merely illustrative and more or less denominational orders may be shown.

It will now be explained how the number whose checking symbol is to be computed is stored up in coded relays and retained therein after the first card has been analyzed by the first set of brushes PB1 and fed further to the next analyzing station in the primary card feed section so that its checking symbol punched on the card may be analyzed by one of the second set of brushes PB2 a cycle later and compared with the computed symbol. This computed symbol in the present machine is a letter, represented by two coded components, as will be explained.

STORAGE RELAYS

Since the digital values of the number are punched in the card according to the IBM statistical card system with a hole representing the digit punched at one of the index point positions 0–9 in a column, ten storage relays may be utilized for each column. It is preferable, however, to reduce the number of storage relays necessary for the storage function by storing them in a lesser number of relays according to a code. For each of the nine controlling columns there are four relays designated R1, R2, R4 and R8 which are energized singly or in combination to represent the punched digital value. For selectively energizing the R1, R2, R4 and R8 relays of each order they are commonly connected by a wire 102 (Fig. 2*g*) to the line side 101 and each has an individual wire connection 103 connected to one side of the associated "*a*" contacts (as in the case of the units order, Fig. 2*g*), which contacts are closed at desired times by means of relays H1, H2, H4 and H8. The common side of each of said "*a*" contacts is connected by a wire 104 to a plug socket 105 which has a plug connection 106 to the PS1 plug socket, as shown for the units order. There are, of course, additional plug connections (like plug connection 106) between the plug sockets PS1 and the plug sockets 105 for the remaining orders. As is well known, the card passes by the related sensing brushes PB1 so that the card holes are sensed in the order 9, 8, 7, 6 . . . 1 and 0 as shown in the timing diagram of Fig. 3. (See "Card Holes" sensing time.)

Referring to Fig. 2*g*, it will be seen that cam contacts C17, C18, C19 and C20 close the simple energizing circuits to the respective relays H1, H2, H4 and H8 and such contacts are closed either singly or in combination at desired times as shown in the wiring diagram. For example, when a 9 card hole is sensed C17 and C20 cam contacts are closed which energize respective H1 and H8 relay contacts, thereby causing the closure of the related "*a*" contacts, as in the case for the units order, to energize the **R1*u* and the R8*u*** relays. The subscripts 1 to 9 singly or when added together correspond to the digit value stored up in the four relays.

To make this clearer by an illustrative example, it will be assumed that the number "2723" is part of the number punched on the card and which comprises the four lowest orders of the illustrative number 509,542,723 to be mentioned later as an example. During the passage of the card by the hundreds PB1 brush, the 7 hole is first sensed, at which time C17, C18 and C19 cam contacts are closed to energize the H1, H2 and H4 relays. Such relays close their respective "*c*" contacts in the hundreds order, thereby energizing the **R1*h*, R2*h* and R4*h*** relays which together by their accumulated subscripts represent the digit value 7.

When the 3 hole passes by the PB1 brush in the units order C17 and C18 cam contacts are closed to energize the H1 and H2 relays which close their respective "*a*" contacts, thereby energizing the **R1*u* and R2*u*** relays to store up in this order the digit value 3.

When the "2" holes in both the tens and thousands orders are analyzed by their respective PB1 analyzing brushes, C18 cam contacts are closed, energizing the H2 relay alone. This will close its respective "*b*" contacts in the tens order and the respective "*d*" contacts in the thousands order, thereby energizing the **R2*t* relay and the R2*th*** relay.

To make it somewhat clearer as to the particular R relays energized for these and each of the remaining digits, the following table illustrates the particular cam contacts C17, C18, C19 and C20 which are energized when each punched hole is sensed and also the particular H and R relays which are energized in accordance therewith.

*Table No. 1*

| Hole Sensed | Cam Contacts Closed | H Relays Energized | R Relays Energized |
|---|---|---|---|
| 9 | C20, C17 | H8, H1 | R8, R1. |
| 8 | C20 | H8 | R8. |
| 7 | C17, C18, C19 | H1, H2, H4 | R1, R2, R4. |
| 6 | C18, C19 | H2, H4 | R2, R4. |
| 5 | C17, C19 | H1, H4 | R1, R4. |
| 4 | C19 | H4 | R4. |
| 3 | C17, C18 | H1, H2 | R1, R2. |
| 2 | C18 | H2 | R2. |
| 1 | C17 | H1 | R1. |
| 0 | None | None | None. |

Figure 2H:
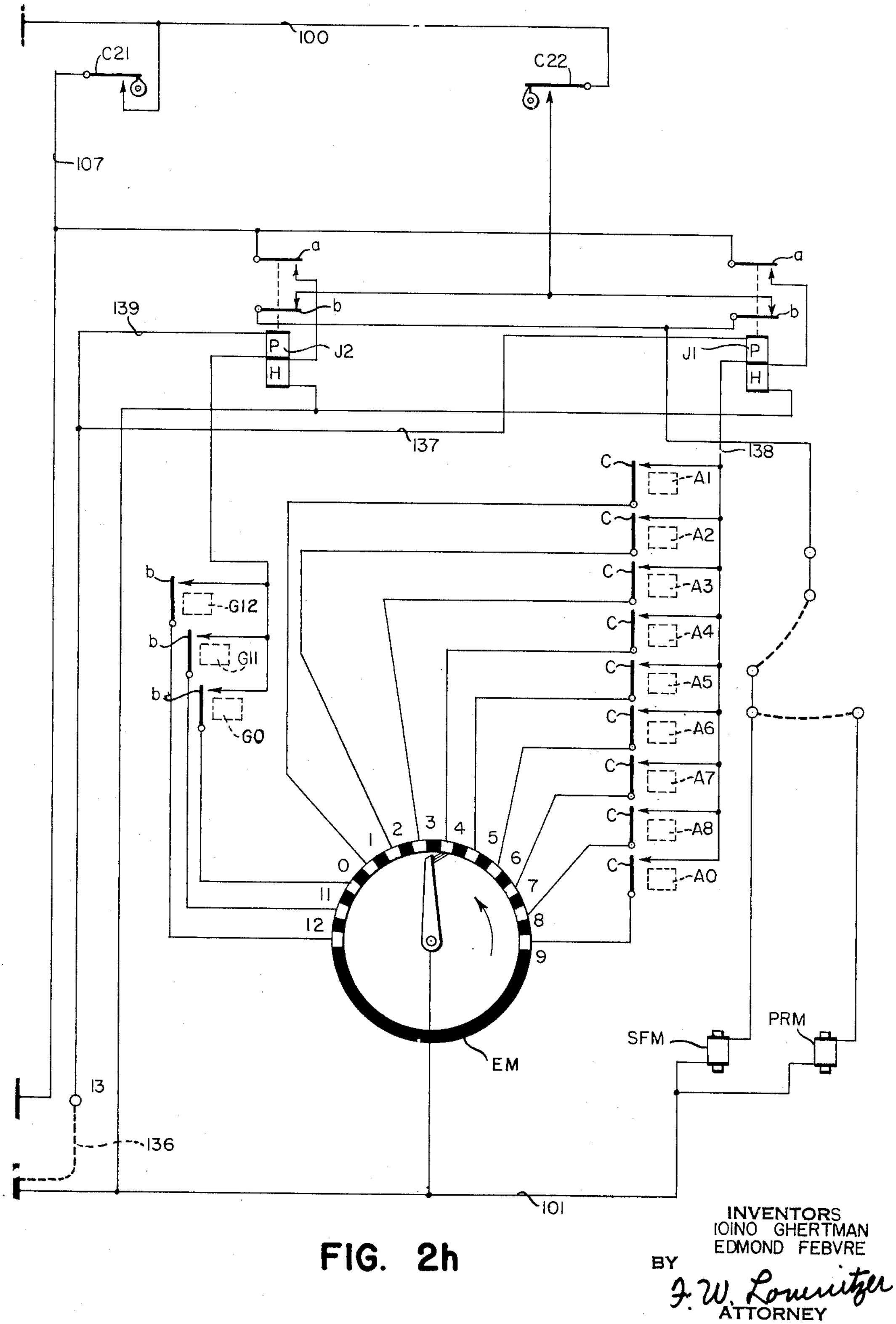

Each of the R relays which is energized closes its respective holding contacts "*h*," thereby causing the H or holding coil of the relay to be retained energized by a circuit from the line 102, through the respective H coil, the "*h*" contacts and wire 107 which leads, as shown in Fig. 2*h*, to cam contacts CR21 to the line side 100. As shown in Fig. 3, C21 cam contacts hold the picked-up R relays energized for nearly the complete cycle. At the end of the cycle cam contacts C21 open, thereby deenergizing all of the R storage relays which have been picked up.

As has been explained, each number punched on a card has an associated punched symbol or character which has been either mentally computed or computed by an operation of this or another machine according to a desired mathematical computation. In the example the number 509,542,723, the letter M has been assigned as the checking symbol or character. The letters are designated on the card by two punched holes, one in the digit position 1–9 and the other in either of the zone positions 0, X or R. For the letter M this is represented in a well known statistical code (see Fig. 5) by a digit hole at X or 11 and a zone hole at 4. The computing circuit now to be described is designed to take each digit and utilize it in a computation carried out according to said desired mathematical process to determine the digit and zone components necessary for the checking symbol of the represented number. If the number punched on the card corresponds to its source, as from a bill or statement, and no error in transposition or erroneous substitution of digits has been made by the card punch operator in punching the card, then the zone and digit components determined by the computing circuit now to be described will be found to agree with the zone and digit holes on the punched card adjacent the number.

As previously stated the present invention may be embodied in various types of machines having record feeding mechanisms, but is preferably incorporated in a collator type of machine of a well known form.

In such form of machine, a card is fed from the primary card hopper and passes by the primary sensing brushes. The sensed number is then stored up, and herein in storage relays.

During the reading cycle, and under control of said storage relays, a computation is carried out for each digit, dependent upon the digit value and its denominational order. Such computation is carried out by computing circuits to be later described. The result of this computation is another number, which is entered in two totalizers, one of a nine digit type, and the other of a three digit type.

To simplify the computation to derive this other number, the units, thousands and millions digits are multiplied by 1, the tens, tens of thousands, tens of millions digits are multiplied by 2, the hundreds, hundreds of thousands and hundreds of millions digits by 4. All of these subproducts are added together to give a new number. By casting out 9's the remainder of the product is represented in one totalizer (the 9 digit type) and is the computed digit component. The three digit type counter reflects the casting out of 3's and indicates a digit which corresponds to the number of 9's in the newly computed number less (3×3) or 9. For example, if the newly computed number is 94 (in an assumed example herein) ten 9's cast out would leave a digit component of 4 in the 9 digit totalizer, after all nines were cast out. Ten 9's with 3's cast out leave a zone component of 1. Because there may be a zero if all 3's are cast out, or a remainder, two 3 digit counters are provided to reflect each condition which together provide the zone component.

EXEMPLARY NUMBER AND COMPUTATION

The number 509,542,723 is selected herein as an example in order that the different operations of the machine, as far as the computing circuit is involved, can be understood. There are nine digits in this number and accordingly nine successive computing operations combining both adding, multiplying and casting out 9's are carried out in the order explained in Table No. 2.

*Table No. 2*

| Computation No. | Digit | Computation | Cam | Mathematics Involved | Relay | Relays |
|---|---|---|---|---|---|---|
| 1 | 3 | Units×1 | C4 | (3×1)=3 | D0 | A3 and E0. |
| 2 | 2 | Tens×2 | C5 | (2×2)=4+3=7 | D0 | B7 and F0. |
| 3 | 2 | Thousands×1 | C6 | (2×1)=2+7=9, cast out 9's, no remainder. | D1 | A0 and E0. |
| 4 | 4 | Tens of Thousands×2 | C7 | (4×2)=8+0=8 | D1 | B8 and F0. |
| 5 | 9 | Millions×1 | C8 | (9×1)=9+8=17, cast out 9's to give a remainder 8. | D1 | A8 and E1. |
| 6 | 0 | Tens of Millions×2 | C9 | (0×2)=0+8=8 | D1 | B8 and F1. |
| 7 | 7 | Hundreds×4 | C10 | (7×4)=28+8=36, cast out 9's, no remainder. | D2 | A0 and E1. |
| 8 | 5 | Hundreds of Thousands×4 | C11 | (5×4)=20+0=20, cast out 9's with a remainder 2. | D2 | B2 and F0. |
| 9 | 5 | Hundreds of Millions×4 | C12 | (5×4)=20+2=22, cast out 9's with a remainder 4. | D2 | A4 and E2. |

Relay E2 determines zone component.
Relay A4 determines digit component.
4 has been determined by the A4 relay to be the digital component for the letter M.
11 or × has been determined by relay E2 to be the digital component for the letter M.
The 11 or × and 4 represent M. See Fig. 5.

COMPUTATION NO. 1

Prior to starting the first computation, cam contacts C3 close at about 178° to pick up the B0 relay (Fig. 2*d*). The circuit is from the line side 100, wire 109, cam contacts C3, the pickup coil of the B0 relay to the line side 101. Said relay is held through its "*a*" contacts and a wire 108 through cam contacts C2, back to the line side 100. Cam contacts C2 are held closed for a sufficient length of time to enable the multiplication of the units digit by 1 and its addition to the product of the tens digit multiplied by 2, and is used similarly for each subsequent computation. It will be recalled that the units digit 3 is stored up by energized relays R1*u* and R2*u* which close their respective contacts R1*u*, *a–e* and R2*u*, *a* and *b* (Fig. 2*a*). The contacts of the R1, R2, R4, R8 relays are interconnected in a translator network circuit that converts the 4 unit coded representation to the single digit representation, which, in accordance with the energization of the R relays, singly or in combination, is reflected by the selection of a digit impulse line 110, 0–9 (Fig. 2*a*). Similar translator circuits are provided for each of the sets of R relays for the remaining denominational orders.

Figs. 2*a* and 2*b* together show the "Times 1" multiplying circuit which multiplies each units, thousands and millions digit by 1 or in effect for the first multiplication by 1 adds the same digit and stores it up in a selected digit relay A, 0–8. When C4 cam contacts (Fig. 2*a*) close a circuit is completed from the line side 100, through cam contacts C4, R8*ua*, R4*ua* relay contacts now normal; R2*ua* contacts and R1*ub* contacts now transferred, the rectifier *r*3, digit line 110—3, thence by digit line *g*3, B0*b*3 contacts (B0 relay now energized) wire 111, wire 112, the hold coil of A3 digit relay to the line side 101. Said relay is held energized through its "*a*" contacts and cam contacts C1 back to the line 100. C1 contacts are timed (see Fig. 3) to hold A3 relay energized so as to enable the addition of the digit 3 represented by the A3 relay to the later derived product of the tens digit multiplied by 2. Therefore, in the first computation A3 relay is energized and it closes its series of contacts A3*b*0–8 shown in Fig. 2*d* preparatory to carrying out computation No. 2.

Also when cam contacts C3 close a branch circuit is extended by wire 113 (Figs. 2*d* and 2*f*) to energize the F0M relay (see Fig. 2*f*). Said relay closes its "*a*" contacts and a hold circuit is completed back to the line 100 by wire 114 (Fig. 2*f* and Fig. 2*d*) through cam contacts C2. The F0M and F0 hold relay coil close their three *a*, *b*, *c* contacts (Fig. 2*f*) so that a supplemental circuit is completed from rectifier *r*3 (Fig. 2*a*), wire N0 (shown in Figs. 2*a*, *b*, *c*, *d*, *e* and *f*) through the F0*ba* contacts to the E0 relay coil, to the line side 101. The E0M hold relay is held through its "*a*" contacts and wire 118 connected, as shown in Fig. 2*b*, to the line side 100 through cam contacts C1. C1 cam contacts hold said E0M relay coil energized the same length of time that the A3 relay coil is held energized.

The wire N0 is the impulse wire for all multiplications by 1 of the digits 1–8. When the multiplicand digit is 9 the multiplication of 1×9 is 9, and wire N1 is the impulse wire, and through F0*bb* contacts would have caused the energization of the E1 relay in the first computation to register one 9 in a product. This will be clearer from the following table:

*Table No. 3*

| Multiply | Product | Wire |
|---|---|---|
| 1X0 | 0 | N0 |
| 1X1 | 1 | N0 |
| 1X2 | 2 | N0 |
| 1X3 | 3 | N0 |
| 1X4 | 4 | N0 |
| 1X5 | 5 | N0 |
| 1X6 | 6 | N0 |
| 1X7 | 7 | N0 |
| 1X8 | 8 | N0 |
| 1X9 | 9 | [1] N1 |

[1] Product of 9 registered.

Also by a wire 113*a* (Fig. 2*f*) branching off the wire 113, a circuit is completed, when C3 cam contacts close, to the D0 relay coil and by wires 115 and 116 to the line side 101. Said D0 relay closes its "*a*" contacts and a hold circuit is extended through D0*a* contacts, D1*a* contacts, D2*a* contacts, cam contacts C14 to the line side 100. Cam contacts C14 will hold the D0 relay energized to almost the end of the cycle if its hold circuit is not opened.

The B0 relay is deenergized when C2 cam contacts open which is prior to the closure of C5 cam contacts for initiating computation No. 2.

At this point it may be well to explain the purpose of the relays E0, E1, E2 and associated relays F0, F1 and F2 in the lower part of Fig. 2*f*. The "E" relays are utilized when a certain result is represented on the "A" relays and the "F" relays when a certain result is represented on the "B" relays. The E0, E1, E2 relays close their *a*, *b* or *c* contacts to pick up the same designated F0, F1 or F2 relays when the result is to be entered in the B relays, and the F0, F1 and F2 relays close their *a*, *b*, or *c* contacts to pick up the same designated relay E0, E1 and E2 when the result is to be entered in the A relays. When, however, the result of a multiplication exceeds 9 and involves a remainder after casting out 9, as for 17 in computation No. 5 (see Table No. 2) with 8 to be represented on the A8 relay, the presence of a 9 in the product of 1×9 will be indicated by selecting the next relay E1, under control of the F0 relay, by means to be later described.

Thus, relays E0, E1, E2 and F0, F1, F2 are instrumentalities which register, as will be clearer as the operation is understood, the number of 9's in the results after casting out 9's, where a remainder is indicated.

However, the result of some computations may be exactly divisible by 9's, that is to say, there is no remainder. There should also be a registration of such 9's in the products. For this reason, when relays A or B hold a number equal to 9 or exact multiples of 9, relays C0, C1, C2, D0, D1 or D2 are utilized. In the first product result "3," D0 relay is energized, but in computation No. 3 the product result will be found to be exactly 9 (see Table No. 2). The D1 relay is energized to register this nine. In computation No. 7 the digit result is 36 or exactly four 9's and thus D2 relay is next energized to register this. The combined representations of the D and E relays select the zone component.

COMPUTATION NO. 2

Referring to Fig. 2*c*, it will be seen that the C5 cam contacts are associated with the tens order translator circuit and initiate a times 2 digit multiplying operation. Contacts C7 and C9 are associated with the tens of thousands and tens of millions orders translator circuit to carry out the same multiplying computation in succession as the checking symbol determination computation proceeds. When cam contacts C5 close at about 218° of the cycle a circuit is completed from line side 100, through said cam contacts C5, R8*ta* contacts now normal, R4*ta* contacts now normal, R2*ta* contacts now transferred, R1*tb* contacts now normal to rectifier *r*22, the circuit then proceeds by the digit line 120–2. The circuit network shown in Figs. 2*c* and 2*d* is a times 2 digit multiplying circuit and an adding circuit combined therewith for adding to the newly computed product the previously computed digit reflected by the previous energization of one of the A relays shown in Fig. 2*b*. In the assumed computation the A3 relay was energized and it, therefore, closed its series of A3*b*, 0 to 8 relay contacts in Fig. 2*d*. The circuit, therefore, extends from the wire 120–2 downwardly to the *j*4 wire, thence across through contacts A3*b*4, to a wire 121 which is connected to the hold coil of the B7 relay and thence to the line side 101. The wire connections are so arranged that a times 2 digit multiplication plus an addition of the previous digit will be effected. It will be seen, therefore, that the energization of the B7 relay indicates by its numeral 7 the multiplication of 2×2=4 plus the addition of 3=7. So far in the computation the result digit 7 has been obtained.

B7 relay is held energized through its "*a*" contacts, C2 cam contacts, back to the line side 100.

A supplemental circuit is also completed from the rectifier *r*22 (Fig. 2*c*) via wire P0 leading, as shown in Figs. 2*c*, 2*d*, 2*e* and 2*f*, through E0*ba* contacts to the F0 relay to the line side 100. The F0 relay is held as previously explained.

In the times two multiplying circuit now being described it is also registered when the product of the multiplication of either the tens, tens of thousands or tens of millions digits times 2 is below 9, above one 9, or equals two 9's. To this end the rectifiers *r*20–*r*29 are connected to wires P0, P2, P1 in such manner as shown in Fig. 2*c* to indicate this. The following table will make it clear the particular "P" wires selected to energize the same or different F0, F1 or F2 relays under control of the previous E0, E1 or E2 relays.

*Table No. 4*

| Multiply | Product | | Wire |
|---|---|---|---|
| 2×0 | 0 | No nines | Wire P0. |
| 2×1 | 2 | | |
| 2×2 | 4 | | |
| 2×3 | 6 | | |
| 2×4 | 8 | | |
| 2×5 | 10 | Over one nine | Wire P1. |
| 2×6 | 12 | | |
| 2×7 | 14 | | |
| 2×8 | 16 | | |
| 2×9 | 18 | Two nines | Wire P2. |

The units digit being assumed to be a 3 and the tens digit 2 the B7 relay corresponds to the computation of 3+(2×2)=7. There is no casting out of 9's because the result has not reached the digit 9 but F0 relay is energized instead of E0 relay.

COMPUTATION NO. 3

In the third computation the thousands digit, 2 is multiplied by 1 and added to the result of the previous computation 7. Since 7 was the last digit result the B7 relay closes its series of "*b*" contacts in Fig. 2*b* and when cam contacts C6 close the circuit shown in Figs. 2*a* and 2*b* is effective to carry out this third computation together with the casting out of 9's in the result. Since the digit 2 is in the thousands order the R2*th* relay alone is energized. When cam contacts C6 close a circuit is completed from line side 100, C6 cam contacts, R8*tha* relay contacts now normal, R4*tha* relay contacts now normal, R2*tha* relay contacts now transferred, R1*thb* contacts now normal, thence by a wire through rectifier *r*2 to wire 110–2, and thence by a wire leading through the B7*b*2 contacts now closed, to wire *ho*, through rectifier *r*56, to the A0 relay to the line side 101. The latter is held through its "*a*" contacts, C1 cam contacts, back to line side 100. It will be seen, therefore, that 0 is the digit result of the computation up to the point now carried out because of the casting out of 9's in the result.

In the multiplication of 2×1 the product 2 is below 9 (see Table 3) and thus the circuit is also completed through the *r*2 rectifier (Fig. 2*a*) to wire N0. As previously described in the section dealing with computation No. 2 the F0M relay (Fig 2*f*) has previously been energized so that a circuit is completed by wire N0, through F0*ba* contacts, to the E0 relay. The hold circuit for this relay has been previously described, it being held through the C1 cam contacts (Fig. 2*b*). The A0 relay was energized because the product was an exact multiple of 9 which is now indicated on relay D1 because D0 was previously energized. A supplemental circuit is now extended through the rectifier *r*40 (Fig. 2*b*), wire 122 which is shown in Figs. 2*b* and 2*f*, through D1*b* contacts now normal, D0*b* contacts now transferred, C0*a* contacts now normal, C1 relay, wires 115 and 116 to the line side 101, thereby energizing the C1 relay. A hold circuit is completed through the C1*b* relay contacts and C13 cam contacts.

C1*c* contacts are the instrumentality for causing the energization of the D1 relay and when said relay contacts close a circuit is completed from line side 100, cam contacts C14 closed when C1 relay energizes, D2*a* relay contacts now normal, C1*c* contacts now closed, D1 relay coil, wires 115 and 116 to the line side 101. The D1 relay coil now transfers its D1*a* contacts, thereby opening the hold circuit for the D0 relay which was previously energized as explained in computation No. 2. The hold circuit for the D1 relay is through its contacts D1*a* now transferred, D2*a* contacts now normal, cam contacts C14 to the line side 100.

It will be seen that when the D1*b* contacts transfer upon the energization of the D1 relay a circuit would be inadvertently completed by wire 122 through D1*b* relay contacts, the C1*a* contacts to the C2 relay. This is prevented by the opening of the C1*a* contacts when the C1 relay is energized. It will be seen, therefore, that the C1*a* contacts are interlock contacts which prevent the erroneous energization of the C2 relay.

Summarizing, it will be seen that D0 relay has been deenergized but the D1 and the A0 relays are now energized which are utilized in carrying out computation No. 4 effected when cam contacts C7 close.

COMPUTATION NO. 4

The next step in the computation is the multiplication of the thousandths digit 4 by 2 and its addition to 0 which 0 is the result of computation No. 3. Mathematically this is $4\times2=8+0=8$, requiring the energization of the B8 relay in Fig. 2*d*. Prior to the closure of cam contacts C7 the R4*tth* relay was energized to transfer its "*a*" contacts (Fig. 2*c*) and also A0 relay has closed its A0, 0–8 contacts in Fig. 2*d*. The circuit is then completed when cam contacts C7 close from the line side 100, through C7 contacts, R8*tthc* relay contacts now normal, R4*ttha* contacts now transferred, R2*tthb* contacts now normal, R1*tthc* contacts now normal, *r*24 rectfier, wire 120–4, wire *j*8, through the A0*b*8 relay contacts now closed, wire 125 to the B8 relay, to the line side 101. B8 relay is held energized by its "*a*" "hold" contacts and C2 cam contacts. Also, as explained in Table No. 4 since the product is 8 (or $4\times2$) a supplemental circuit is establshed by wire P0, E0*ba* contacts (Fig. 2*f*) to the F0 relay to line side 101. B8 and F0 are now energized (see Table No. 2).

COMPUTATION NO. 5

The million order digit is, in the example, the digit 9 represented by the energization of the R*m*8 and the R*m*1 relays. When cam contacts C8 close a circuit is completed from the line side 100 through C8 cam contacts, R8*ma* relay contacts now transferred, R*m*1*e* relay contacts now transferred, rectifier *r*9, wire 110–9, wire *g*0, contacts B8*b*0 now closed since the B8 relay is now energized, the A8 relay coil, to the line side 101. This relay is held energized through its "*a*" hold contacts and C1 cam contacts, back to line side 100. This circuit, therefore, carries out the multiplication of $9\times1$ and through the B8 relay adds the digit 8, casts out the 9's and denotes the remainder 8 by the energization of the A8 relay. A supplemental circuit is completed because the product involves one 9 (see Table No. 3) and extends from the other side of *r*9 rectifier (Fig. 2*a*), wire N1 leading, as shown in Figs. 2*a*, 2*b*, 2*c*, 2*d*, 2*e* and 2*f*, through F0*bb* contacts, relay E1, to the line side 101.

E1 relay is held through its E1*a* relay contacts, wire 118, C1 cam contacts back to line side 100.

COMPUTATION NO. 6

This involves multiplication of the tens of millions digit 0 times 2 which equals 0 and adding the digit 8 derived from computation No. 5. This is effected by the times 2 multiplying and adding circuit when cam contacts C9 close. A circuit is then completed from line side 100, cam contacts C9, R8*tma*, R4*tma*, R8*tma*, R1*tma* relay contacts which are all now normal, rectifier unit *r*20, wire 120–0, wire *j*0 (Fig. 2*d*), through the respective A8*b*0 relay contact now closed, the B8 relay coil to the line side 100. Energization of the B8 relay represents the digit 8 which is the result of adding 8 to 0.

Also because $2\times0=0$ and is below 9 (see Table No. 4), a supplemental circuit is completed from the *r*20 rectifier unit, wire P*o*, leading, as shown in Fig. 2*f*, through the E1*ba* relay contacts now closed since E1 relay was energized in computation No. 6, the F1 relay to the line side 101. The F1 relay is held energized through F1*a* hold contacts and C2 cam contacts (Fig. 2*d*) back to the line side 100. B8 and F1 relays are now energized (see Table No. 2).

COMPUTATION NO. 7

In this step of computation the hundreds digit –7– is multiplied by 4 and its product –28– is added to the result of computation No. 6 or the digit 8, making a total of 36. With the casting out of 9's relay A0 should represent the result of computation No. 7.

Each of the last three computations consists of the multiplication of the digit by 4 and the computing circuit shown in Figs. 2*e* and 2*b* is designed to automatically effect the multiplication of either the hundreds, hundreds of thousands, or hundreds of millions digit by four and add the previously computed digit. Since 7 is the assumed digit in the hundreds order the R4*h*, R2*h* and the R1*h* relays are energized so that when cam contacts C10 close a circuit will be completed from the line side 100 through cam contacts C10, R8*ha* relay contacts now normal, R4*ha* contacts now transferred, R2*hb* contacts now transfered, R1*hd* contacts now transferred, rectifier *r*17, wire *g*1, and the circuit then leads by wire *g*1 in Fig. 2*b* through the B8*b*1 contacts, (since B8 was previously energized), through rectifier *r*56, A0 relay to the line side 101.

Referring now to Fig. 2*b*, a supplemental circuit is closed because there is no remainder after casting out four 9's which extends from the rectifier *r*56, wire 122 (top of Fig. 2*f*) and thence, as shown in Fig. 2*f*, through the D1*b* contacts now transferred (since D1 relay was the last one energized in computation No. 3), relay contacts C1*a*, C2 relay, wires 115, 116, to the line side 101. The C2 relay is held through its C2*b* relay contacts and cam contacts C13 back to the line side 100. C2 relay transfers its C2*c* contacts, completing a circuit from the line side 100, cam contacts C14, wire 127, through C0*d* contacts now normal, C2*c* contacts now closed, D2 relay coil, wires 115, 116 to the line side 101. D2 relay is held by the D2*a* contacts and C14 cam contacts. The D2 relay transfers the D2*a* contacts, thereby opening the hold circuit of the D1 relay and the latter deenergizes. D2 relay is now energized instead of the D1 relay.

In multiplication of 4 by the digits 0–9 the product may be under 9, or include one or more 9's, in which case N0, N1, N2 impulse wires are selected when the A relays are to be energized and the P0, P1, P2 impulse wires when the B relays are to be energized.

The particular wires utilized will be clear from the following Table No. 5:

*Table No. 5*

| Multiply | Product | Wires (A Relays) | Wires (B Relays) |
|---|---|---|---|
| 4×0=----- | 0 | N0—No 9's---------- | P0. No 9's. |
| 4×1=----- | 4 | | |
| 4×2=----- | 8 | | |
| -×3=----- | 12 | N1—One 9 plus remainder---------- | P1. |
| 4×4=----- | 16 | | |
| 4×5=----- | 20 | N2—Two 9's plus remainder---------- | P2. |
| 4×6=----- | 24 | | |
| 4×7=----- | 28 | N0—Three 9's plus remainder---------- | P0. |
| 4×8=----- | 32 | | |
| 4×9=----- | 36 | N1—Four 9's---------- | P1. |

It should be noted that the rectifiers *r*10–19, *r*30–39 are connected to wires P0, P1, P2, N0, N1, N2 to select the latter according to the above table.

Therefore, in this computation, because 4×7=28 includes three 9's, a supplemental circuit is completed from the rectifier *r*17 (Fig. 2*e*), wire N0, through the contacts F1*ba*, E1 relay to the line side 101. Relay E1 is held, as previously described, through its "*a*" contacts and cam contacts C1.

COMPUTATION NO. 8

This computation consists of the multiplication of the hundreds of thousands digit 5 times 4 which equals 20 and its addition to the last digit result 0. The result of this computation –20– with the 9's cast out will be the remainder 2. The computation is initiated by a circuit from the line side 100 through C11 cam contacts, the R8*htha* contacts now normal, R4*htha* contacts now transferred, R2*hthb* contacts now normal, R1*hthc* contacts now transferred to the rectifier *r*35. The circuit then extends via wire 130 to P2 wire, through the respective E1*bc* relay contacts of the E1 relay (Fig. 2*f*), the F0 relay to the line side 101. F0 relay is now held through the hold circuits previously described.

A supplemental circuit is completed from the other side of the rectifier *r*35 (Fig. 2*e*) to wire *j*2 (see also Fig. 2*d*), through the respective relay contact A0*b*2 of the A0 relay (since 0 was the digit result of the last computation), rectifier *r*66, B2 relay to the line side 101. This relay by its subscript 2 represents the digit result of computation No. 8.

COMPUTATION NO. 9

The hundreds of millions digit 5 is, in this computation, multiplied by 4 and the product 20 is added to the last digit result 2 which equals 22. With the casting out of 9's a 4 digit should be the final result of the complete computation which indicates the digit component 4 of the letter M.

The computing circuit is completed from the line side 100, through cam contacts C12 (Fig. 2*e*), R8*hma* contacts now normal, R4*hma* contacts now transferred, R2*hmb* contacts now normal, R1*hmc* contacts now transferred, *r*15 rectifier, wire *g*2 (see now Fig. 2*b*), the respective contact B2*b*2 of the B2 relay (since 2 was the last computed digit) rectifier *r*60, A4 relay to the line side 101. A4 relay is held through its respective "*a*" contacts and cam contacts C1 back to the line side 100 up to about 175° of the next cycle. The subscript 4 of the A4 relay indicates the final digit result of the complete computation.

In parallel with the A4 relay a circuit is completed from the rectifier unit *r*15 (Fig. 2*e*), wire N2, and as shown in Fig. 2*f*, through the respective contact F0*bc* of the F0 relay to the E2 relay, to the line side 101. E2 relay is held through its respective hold contact and cam contact C1.

At the end of the last computing operation a circuit is completed from the line side 100 through C15 cam contacts, D2*c* relay contacts now closed, the respective relay contact E2*cc* of the E2 relay, G11 relay, to the line side 100. G11 relay is held through its respective "*a*" contacts and C16 cam contacts back to the line side

100. The G11 relay indicates by its number the 11 or X zone component of the letter M. In the statistical alphabetic code (see Fig. 5) the 4 index point position and 11 (or X) index point position are in the combination which represent the letter M. It is to be noted that the C16 cam contacts (Fig. 3) hold the G11 relay energized up to about 250° of the next cycle. It will also be noted that the A4 relay is held energized by C1 cam contacts from 360° to the end of the cycle and up to about 175° of the next cycle. Thus, the last A and G relays energized, which represent the final digit and zone result, are held energized for a considerable part of the next cycle, during which time they are compared with the punched character representing holes on the card. The manner in which this comparison is effected will now be described.

COMPARING OPERATION

The computing device has determined that for the exemplary number the checking letter M is indicated by the 4 and 11 components. Since the punched number on the card also carries this letter in punched hole form with a hole at the 4 index point position and one at the 11 index point position, it is desirable to make a comparison. This comparing operation is effected when the controlling card is passed by the second reading station wherein an analyzing brush PB2 (Figs. 1 and 2*g*) in cooperation with a contact roll PCR2 senses the position of the holes with 11 sensed first and thereafter the 4 of the controlling column. The impulse circuit extends, as previously described, from the line side 100 through cam contacts C4A (Fig. 2*g*), P1D1 circuit breaker contacts, card lever contacts PCL1 and PCL2, brush PCB2, roller PCR2, brush PB2. The plug socket of the associated brush has a plug connection 136 shown in Figs. 2*g* and 2*h*, thereby extending the circuit via wire 137 to the pickup coil of the J1 relay to a wire 138. An emitter E*m* connected to the line side 101 (Fig. 2*h*) transmits impulses simultaneously with the sensing of the card holes in the order 9, 8, 7–0, 11, 12 and since the digit 4 is assumed to be one of the components the circuit will be completed, if there is a corresponding 4 hole, by the wire 138, through the A4*c* relay contacts now closed by the A4 relay of Fig. 2*b*, to the 4 contact point of emitter E*m*, through its brush and to the line side 101. When the 11 hole is later sensed a similar circuit is completed from the wire 139, through the pickup coil of the J2 relay, the G11*b* relay contacts, the 11 contact point of emitter E*m*, the brush of the emitter, to the line side 100. Since it is assumed there is an agreement both J1 and J2 relays are energized and each is held through its respective "*a*" hold contact and C21 cam contacts which hold both relays energized until nearly the end of the comparing cycle.

Upon an agreement both J1 and J2 relays open their respective "*b*" contacts, thereby preventing the transmission of an impulse by the C22 cam contacts to certain controlling magnets which differently distribute the records when a disagreement is effected.

As is fully shown and described in the aforementioned patent to R. E. Page No. 2,359,670 the card which is found to be correct will be fed out of the second reading station by rollers 206 (Fig. 4) and 207 (the latter shown in the patent only). The sorting blade 308 normally occupies a position below the line of the feed of the primary cards as shown in Fig. 4, whereby the correct cards pass over the blade 308 and underneath blade 307 into the MS pocket.

DISTRIBUTION OF INCORRECTLY DESIGNATED CARDS

In the event that the symbol designation on the card does not agree with that determined by the computing mechanism then either or both of the J1 and J2 relays will not be energized. It may be well to consider under what circumstances a disagreement is determined by reference to certain examples. One of such errors would be the erroneous substitution of a digit and such example would be the number 509,542,523 wherein it will be noted the 5 in the hundreds order has been substituted for the correct digit 7 in the assumed correct example. The computing mechanism would, therefore, carry out a computation based upon this number and mathematically it would be represented as follows:

$$1(9+2+3)+2(4+2)+4(5+5+5)=86$$

casting out

9's=86−81=5 which is the digit component

There are nine

9's=9−(3×3)=0 zone component 9 is the number of 9's in 86

In the statistical code (see Fig. 5) this would represent the symbol "V" but since the symbol "M" has been punched by holes at the 4 digit position and the 1 zone position neither J2 nor J1 relays would be energized and the "*b*" contacts would remain closed. As will be explained, this will alter the normal distribution of the card.

Another example would be an error resulting from the inversion of two consecutive digits when the operator punched the card. This could be illustrated by the following example:

509,524,723

It will be noted by comparison with the first example number 509,542,723 that 24 has been punched instead of 42. The computing mechanism would carry out a computation expressed by the following equation according to the digits of the incorrect number.

$$1(9+4+3)+2(2+2)+4(5+5+7)=92$$

casting out

9's=92−90=2 digit component

Ten 9's registered

=10−(3×3)=1 zone digit or 11

Figure 5:
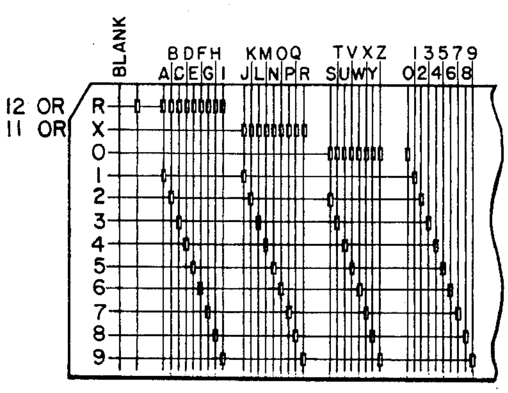
Fig. 5 represents the alphabetical and numerical code.

This represents the letter J in the code of Fig. 5 and since there is an agreement in the 11 zone with the 11 hole of the letter M punched on the card, the J2 relay will be energized. The digit component 2 of the letter J disagrees with the digit component 4 of the symbol M and J1 will not be energized. Therefore, J1*b* contacts remain closed to allow an impulse circuit to effect a change in the distribution of the erroneous record.

A third example would be the erroneous inversion of two non-consecutive digits as in the number:

502,594,723 wherein 2 and 9 have been erroneously substituted for 9 and 2. Mathematically the computation would be carried out by the following equation:

$$1(4+2+3)+2(9+2)+4(5+5+7)=99$$

casting out

9's=99−99=0 for digit component 11 9's registered

=11−(3−3)=2 for zone component

This represents the letter B and both components disagree with the components for the symbol M punched on the card.

Whenever one or both of the "*b*" contacts remain closed a circuit is closed from the line side 100 through cam contacts C22, through J2*b* or J1*b*, or both, thence by the plug connection shown to cause the circuit to be completed through the SFM and PRM magnets to the line side 100. The effect of both of these magnets which correspond to the same designated magnets of the machine shown in the Page Patent No. 2,359,670, will now be explained by particular reference to Fig. 4.

When magnet PRM is energized the blade 308 is pushed upwardly above the line of feed of the cards fed by the primary card feed and, therefore, the erroneous card will then pass beneath the blade 308 into the primary reject pocket PRJ.

It is advisable to substitute a blank card to be fed in the MS pocket to indicate by the presence of such blank card that an erroneous punched card has been detected. This is effected by the energization of the SFM magnet, which magnet, as shown and described in the aforementioned Page patent, controls the feed mechanism of the secondary hopper to cause a blank card to be fed from the secondary hopper to be ultimately fed in the MS pocket to replace the erroneous punched card which has passed into the primary reject pocket PRJ.

While there have been shown and described and pointed out the fundamental novel features of the invention, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine controlled by a punched record having holes designating digits of a number for computing in accordance with the holes in said record digit and zone components of a statistical alphabetical code representing a checking letter, the combination of means for analyzing the digit holes of said number, means for receiving and representing the digit component of said letter, other means for receiving and representing the zone component of said letter, computing means operable under control of said digit hole analyzing means to effect a succession of computing operations, one for each digit of the number to secure a result of the computation, and means to derive from said result a digit component and a zone digit component and to enter said digit and zone components in the respective receiving means.

2. In a machine controlled by a punched record having holes designating digits of a number and holes at digit and zone index points representing a checking letter derived from said number by a computation enabling the derivation of digit and zone components, the combination of means for analyzing the digit holes of said number, other analyzing means to analyze the zone and digit letter representing holes, means for receiving and representing the digit component of said letter, other means for receiving and representing the zone component of said letter, computing means operable in accordance with said computation and under control of said digit hole analyzing means to effect a succession of computing operations, one for each digit of the number to obtain the result of the computation, and means to derive from the result the digit component and the zone digit component and to enter said digit and zone components in the respective receiving means, and means for comparing the zone and digit holes representing the checking letter with the respective zone and digit representations on the zone and digit component receiving means.

3. In a machine for determining the correctness of a checking letter identified by coded digit and zone component holes on the record derived by effecting a computation under control of a number, said record having holes representing units, tens and hundreds digits of the number, means for analyzing said digit representing holes representing the number, computing means for multiplying under control of the analyzing means the units, tens and hundreds digits by 1, 2 and 4, respectively to obtain successive products and for cross-adding the products, said computing means including means to cast out 9's from the successive products to derive a digit remainder representing the digit component, means for registering the number of 9's cast out from successive products, means for casting out 3's in said registering means to derive a remainder representing a zone component representation, and means for comparing the digit and zone component holes on the record with the zone and digit components derived in the computation to determine whether or not they agree.

4. In a machine controlled by a punched record having holes designating digits of a number and holes at digit and zone index points representing a checking letter derived from said number by a computation enabling the derivation of digit and zone components, the combination of means for analyzing the digit holes of said number, other analyzing means to analyze the zone and digit letter representing holes, means for receiving and representing the digit component of said letter, other means for receiving and representing the zone component of said letter, computing means operable in accordance with said computation and under control of said digit hole analyzing means to effect a succession of computing operations, one for each digit of the number to obtain a result, and to derive from said result the digit component and the zone digit component and to enter said digit and zone components in the respective receiving means, means for comparing the zone and digit holes representing the checking letter with the respective zone and digit representations on the zone and digit component receiving means to determine whether they agree or disagree, a pair of record sorting pockets, means for feeding blank records, means controlled by said comparing means upon ascertaining an agreement for feeding agreeing records in one pocket, and upon ascertaining a disagreement for feeding disagreeing records in the other sorting compartment and concomitantly causing the operation of the blank record feeding means to feed a blank record in said one compartment.

5. In a machine for deriving from a number a checking digit, the combination of means for setting and storing up digit representations of the units, tens, and hundreds order of the number, digit receiving means representing the checking digit, means for casting out 9's from successive products entered in said digit receiving means, 1 multiplier digit multiplying means for multiplying under control of said units digit storing means the units digit by 1 for obtaining the first product, 2 multiplier digit multiplying means for multiplying under control of the tens digit storing means the tens digit by 2 for obtaining a second product, 4 multiplier digit multiplying means under control of the hundreds digit storing means for multiplying the hundreds digit by 4 for obtaining the third product, and means for cross-adding the first, second, and third products in said digit receiving means and concomitantly casting out 9's from the products entered therein whereby said digit receiving means represents the checking digit of the number.

6. In a machine for deriving from a number a checking digit, the combination of means for setting and storing up digit representations of the units, tens, and hundreds order of the number, a pair of A and B digit receiving means, one of which represents the checking digit, means for casting out 9's from products entered in each of said receiving means, 1 multiplier digit multiplying means for multiplying under control of said units digit storing means the units digit by 1 for obtaining the first product and entering the same in the A digit receiving means, 2 multiplier digit multiplying means for multiplying under control of the tens digit storing means the tens digit by 2 for obtaining a second product, means for adding to the B digit representing means the first and second products to obtain therein after casting out 9's therefrom the units digit of a cross-added product, means for clearing out the first product in the A digit receiving means, 4 multiplier digit multiplying means under control of the hundreds digit storing means for multiplying the hundreds digit by 4 for obtaining the third product, and means for adding to the A receiving means the digit result in the B receiving means and the third product, whereby said A receiving means after casting out 9's therefrom represents in the units order the checking digit of the number.

7. In a machine for deriving from a three-digit number a checking symbol characterized by two coded components, the combination of means for setting and storing up representations of the units, tens and hundreds digits of the number, means for receiving the results of each computation and for representing one component, other means for receiving and representing the other component, computing means comprising 1, 2 and 4 digit multiplying means for multiplying, under control of the units digit storing means the units digits by 1, for multiplying under control of the tens digit storing means the ten digits by 2, and for multiplying under control of the hundreds digit storing means the hundreds digits by 4, means for adding each product of the multiplications to the first named receiving means and for concomitantly casting out 9's from each product whereby said first named receiving means represents said one component, and means controlled by said computation result receiving means and responsive to 9 or multiple of 9's representations therein after each adding computation and by the 1, 2 and 4 digit multiplying means in accordance with the presence of no 9's, or one or more nines in each product to effect in said other component receiving means an entry representing said other component.

8. In a machine for deriving from a three-digit number a checking symbol characterized by two coded components, the combination of means for setting and storing up representations of the units, tens and hundreds digits of the number, means for receiving the results of each computation and for representing one component, other means for receiving and representing the other component, computing means comprising 1, 2, and 4 digit multiplying means for multiplying, under control of the units digit storing means the units digits by 1, for multiplying under control of the tens digit storing means the tens digits by 2, and for multiplying under control of the hundreds digit storing means the hundreds digits by 4, means for adding the product of each multiplication in said first named receiving means and for casting out 9's from each of said products whereby said first named receiving means represents said one component, and means controlled by said computation result receiving means and responsive to 9's or multiples of 9's representations therein after each adding and multiplying computation and by the 1, 2, and 4 digit multiplying means in accordance with the presence of no 9's, or one or more nines in each product to effect in said other component receiving means an entry representing said other component.

9. In a machine for deriving from a number a checking symbol characterized by two coded components, the combination of means for setting and storing up representations of the digits of the number, means for receiving the results of each computation for representing one component, other means for receiving and representing the other component, computing means comprising 1, 2 and 4 digit multiplying means for multiplying, under control of the units, thousands and millions digit storing means said digits by 1, for multiplying under control of the tens, tens of thousands, and tens of millions digit storing means the digits by 2, and for multiplying under control of the hundreds, thousands, and millions digit storing means the digits by 4, means for adding the products of the multiplications in said first named receiving means, and for casting out 9's from each product, whereby said first named receiving means represents said one component, and means controlled by the computation result receiving means and responsive to 9's or multiple of 9's representations therein after each multiplying and adding computation and controlled further by the 1, 2 and 4 digit multiplying means in accordance with the number of 9's in each product to effect in said other component receiving means an entry representing said other component.

10. In a machine for deriving from a multidenominational number a checking letter characterized by a O, X, R zone component and a digit component, the combination of means for setting and storing up representations of the digits of the number, means for receiving the digit results of each computation for representing the digit component, other means for receiving an entry representing the O, X, R zone component, computing means comprising 1, 2, and 4 digit multiplying means for multiplying under control of the units, thousands, and millions digit storing means the stored up digits by 1, for multiplying under control of the tens, tens of thousands, and tens of millions digit storing means the stored up digits by 2, and for multiplying under control of the hundreds, thousands, and millions digit storing means the stored up digits by 4, means for adding each of said products to the first named receiving means and for casting out 9's therefrom whereby said first named receiving means represents said one component, means controlled by said digit receiving means and responsive to 9 or multiple of 9's representations in the digit receiving means after each adding computation and by the 1, 2 and 4 digit multiplying means in accordance with the presence of no 9's, 1 or 2 nines in each product to effect an entry in said zone component receiving means which represents the O, X, or R zone component.

11. In a machine for deriving from a number a checking symbol characterized by two coded components, the combination of means for setting and storing up representations of the digits of the number, means for receiving the results of each computation for representing one component, two other means for receiving and representing subcomponents from which the other component is derived, computing means comprising 1, 2, and 4 digit multiplying means for multiplying under control of the units, thousands and millions digit storing means, said digits by 1, for multiplying under control of the tens, tens of thousands, and tens of millions digit storing means the digits by 2, and for multiplying under control of the hundreds, thousands, and millions digit storing means the digits by 4, means for adding each product in said first named receiving means and for casting out 9's from each product whereby said first named receiving means represents said one component, means controlled by said computation result receiving means and responsive to 9 or multiple of 9's representations therein after each multiplying and adding computation to effect an entry in one subcomponent receiving means, means controlled by the 1, 2 and 4 digit multiplying means for controlling entries in the other subcomponent receiving and representing means in accordance with the presence of 9's in each product, and means controlled by both of said subcomponent receiving means to derive said other component.

References Cited in the file of this patent

UNITED STATES PATENTS 2,684,199 Starreveld July 20, 1954